(12) United States Patent
Iwata et al.

(10) Patent No.: US 10,519,851 B2
(45) Date of Patent: Dec. 31, 2019

(54) TURBOCHARGER

(71) Applicant: TOYOTA JIDOSHA KABUSHIKI KAISHA, Toyota-shi, Aichi-ken (JP)

(72) Inventors: Akitoshi Iwata, Seto (JP); Takashi Tsunooka, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/048,978

(22) Filed: Jul. 30, 2018

(65) Prior Publication Data

US 2019/0078507 A1   Mar. 14, 2019

(30) Foreign Application Priority Data

Sep. 8, 2017   (JP) .................................. 2017-172856

(51) Int. Cl.
    *F02B 37/18*   (2006.01)
    *F16K 1/20*    (2006.01)
    *F02B 37/02*   (2006.01)

(52) U.S. Cl.
    CPC ............ *F02B 37/183* (2013.01); *F02B 37/02* (2013.01); *F16K 1/2021* (2013.01)

(58) Field of Classification Search
    CPC ...... F02B 37/183; F02B 37/02; F02B 37/186; F02B 37/18; F02B 37/013; F02B 37/04
    See application file for complete search history.

(56) References Cited

U.S. PATENT DOCUMENTS

| | | | | |
|---|---|---|---|---|
| 5,046,317 A | * | 9/1991 | Satokawa | ............. F01D 17/105 60/602 |
| 2009/0151352 A1 | * | 6/2009 | McEwan | ............... F01D 17/105 60/602 |
| 2012/0255297 A1 | * | 10/2012 | Boning | ................. F02B 37/183 60/602 |
| 2015/0010390 A1 | * | 1/2015 | Onitsuka | ............. F02D 41/0255 415/145 |
| 2017/0152793 A1 | * | 6/2017 | Albrecht | ............... F01N 3/2006 |
| 2019/0218962 A1 | * | 7/2019 | Saeki | ........................ F01N 3/28 |

FOREIGN PATENT DOCUMENTS

| | | |
|---|---|---|
| JP | 2012-002094 A | 1/2012 |
| JP | 2015-014258 A | 1/2015 |
| JP | 2016-160785 A | 9/2016 |
| JP | 2017-082762 A | 5/2017 |
| JP | 2017082762 A * | 5/2017 |

* cited by examiner

*Primary Examiner* — Patrick D Maines
(74) *Attorney, Agent, or Firm* — Oliff PLC

(57) ABSTRACT

A turbocharger includes a turbine housing and a wastegate. The turbine housing has an accommodation space, is which a turbine wheel is accommodated. The accommodation space is connected to a scroll passage, which draws exhaust gas from the outside of the turbine housing, and a connection passage, which discharges exhaust gas from the accommodation space. The connection passage is connected to a merging passage, which discharges exhaust gas to the outside of the turbine housing. The merging passage is connected to a bypass passage, which bypasses the accommodation space. The central axis of an outlet portion of the connection passage is inclined with respect to the rotation axis of the turbine wheel toward the side on which an outlet portion of the bypass passage is located.

5 Claims, 3 Drawing Sheets

TURBOCHARGER

BACKGROUND

The present disclosure relates to a turbocharger.

The turbine housing in the turbocharger disclosed in Japanese Laid-Open Patent Publication No. 2017-082762 is provided with an accommodation space that accommodates a turbine wheel. This accommodation space is connected to a scroll passage, which draws exhaust gas from the outside of the turbine housing to the accommodation space. The accommodation space is also connected to a connection passage, which discharges exhaust gas from the accommodation space. The connection passage extends along the rotation axis of the turbine wheel. A section of the connection passage on the downstream side in the exhaust flow direction is connected to a merging passage, which discharges exhaust gas from the inside of the turbine housing. In addition, the turbine housing has a bypass passage extending from the scroll passage to the merging passage while bypassing the accommodation space.

The turbocharger of the above publication includes a wastegate, which has a pivot shaft pivotally supported by the turbine housing. A first valve member is fixed to the pivot shaft of the wastegate. Also, a second valve member is fixed to the pivot shaft of the wastegate to be separated from the first valve member in the circumferential direction about the pivot axis of the pivot shaft. When the pivot shaft pivots to one side, the first valve member closes the outlet portion of the connection passage. When the pivot shaft pivots to the other side, the second valve member closes the outlet portion of the bypass passage.

The turbine housing of the turbocharger disclosed of the above publication has a first sealing surface at the outlet portion of the connection passage. The first sealing surface is inclined with respect to a plane orthogonal to the central axis of the outlet portion of the connection passage to face the outlet portion of the bypass passage.

In the turbocharger disclosed in the above publication, the angle by which the first sealing surface is inclined with respect to the second sealing surface, which faces the second valve member at the outlet portion of the bypass passage, is smaller than that in a case in which the first sealing surface is orthogonal to the central axis of the outlet portion of the connection passage. This reduces the pivoting range of the wastegate from the state in which the first valve member of the wastegate is in contact with the first sealing surface to the state in which the second valve member is in contact with the second sealing surface.

In the turbocharger of the above publication, the first sealing surface is inclined as if cut obliquely. Therefore, the opening area of the outlet portion of the connection passage is larger than that in other cases. Accordingly, in the turbocharger of the above publication, the first valve member of the wastegate is relatively large in order to close the outlet portion of the connection passage. Therefore, the turbocharger of the above publication has room for further improvement in terms of miniaturization of the wastegate.

SUMMARY

In accordance with one aspect of the present disclosure, a turbocharger is provided that includes a turbine housing, which accommodates a turbine wheel, and a wastegate, which is rotationally supported by the turbine housing. The turbine housing includes an accommodation space, in which the turbine wheel is accommodated, a scroll passage, which is connected to the accommodation space and is configured to draw exhaust gas from outside of the turbine housing to the accommodation space, a connection passage, which is connected to the accommodation space and is configured to discharge exhaust gas from the accommodation space, a merging passage, which is connected to the connection passage and is configured to discharge exhaust gas to the outside of the turbine housing, and a bypass passage, which bypasses the accommodation space and is connected to the merging passage. The connection passage has an outlet portion that is connected to the merging passage. The bypass passage has an outlet portion that is connected to the merging passage. The wastegate includes a pivot shaft, which is pivotally supported by the turbine housing, a first valve member, which is fixed to the pivot shaft and is configured to close the outlet portion of the connection passage, and a second valve member, which is fixed to the pivot shaft to be separated from the first valve member in a circumferential direction about a pivot axis of the pivot shaft, the second valve member being configured to close the outlet portion of the bypass passage. A central axis of the outlet portion of the connection passage is inclined with respect to a rotation axis of the turbine wheel toward a side on which the outlet portion of the bypass passage is located.

Other aspects and advantages of the present disclosure will become apparent from the following description, taken in conjunction with the accompanying drawings, illustrating exemplary embodiments.

BRIEF DESCRIPTION OF TEE DRAWINGS

The disclosure may be understood by reference to the following description together with the accompanying drawings.

DETAILED DESCRIPTION

One embodiment of the present disclosure will now be described with reference to FIGS. 1 to 3. First, a schematic configuration of an internal combustion engine 100 equipped with a turbocharger 50 of the present embodiment will be described.

Figure 1:
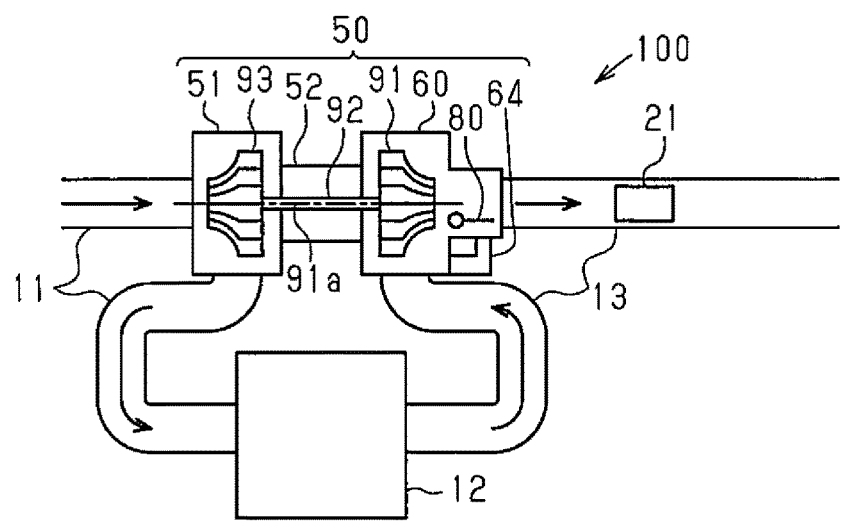
FIG. 1 is a schematic diagram of an internal combustion engine according to one present embodiment.

As shown in FIG. 1 the internal combustion engine 100 has an intake passage 11 configured to draw in intake air from the outside of the engine 100. The intake passage 11 is connected to a cylinder 12, which mixes fuel with the intake air and burns the mixture. The cylinder 12 is connected to an exhaust passage 13 configured to discharge the exhaust gas from the cylinder 12. The exhaust passage 13 incorporates a catalyst 21, which purifies exhaust gas.

The internal combustion engine 100 has a turbocharger 50 configured to compress intake air. The turbocharger 50 has a compressor housing 51, which is arranged in the middle of the intake passage 11. The turbocharger 50 also has a turbine housing 60, which is arranged in a section of the exhaust passage 13 that is upstream of the catalyst 21. The compressor housing 51 and the turbine housing 60 are connected to each other via a bearing housing 52 of the turbocharger 50.

The turbine housing 60 accommodates a turbine wheel 91, which is rotated by flow of exhaust gas. The turbine wheel 91 is rotational about a rotation axis 91a of the turbine wheel 91. The turbine wheel 91 is connected to a first end of a shaft 92. The central portion of the shaft 92 is accommodated in the bearing housing 52. The shaft 92 is rotationally supported by a bearing (not shown). The rotation axis of the shaft 92 is coaxial with the rotation axis 91a of the turbine wheel 91. A second end of the shaft 92 is connected to a compressor wheel 93. The compressor wheel 93 is accommodated in the compressor housing 51. The rotation axis of the compressor wheel 93 is coaxial with the rotation axis 91a of the turbine wheel 91. The compressor wheel 93 rotates with rotation of the turbine wheel 91 to compress the intake air and supplies it to the cylinder 12.

The turbocharger 50 includes a wastegate 80, which is pivotally supported by the turbine housing 60. The turbocharger 50 pivots the wastegate 80 to selectively close and open a bypass passage 64 inside the turbine housing 60.

Next, the turbine housing 60 and the wastegate 80 will be described.

Figure 2:
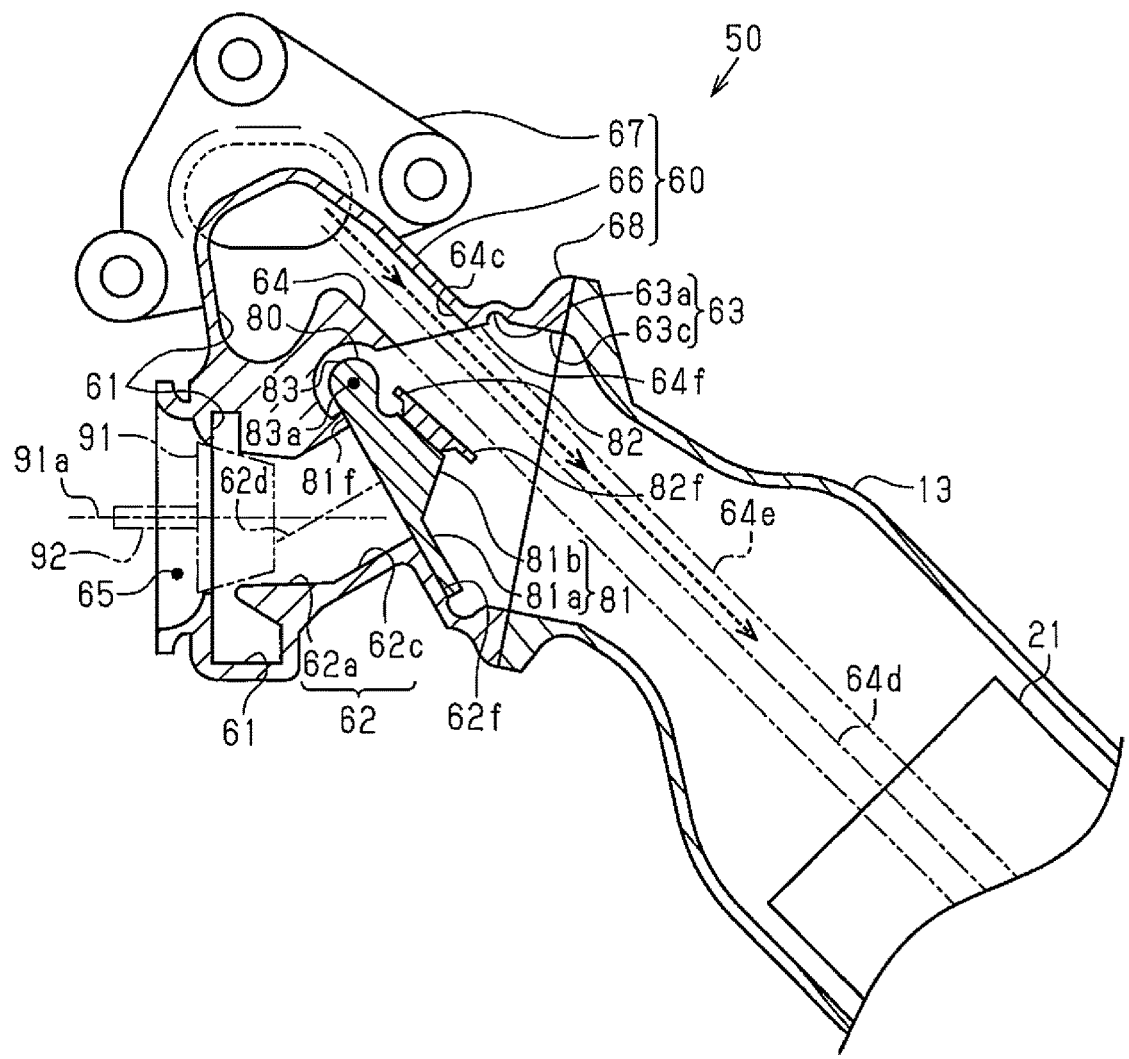
FIG. 2 is a cross-sectional view of the turbocharger of FIG. 1.

As shown in FIG. 2, the turbine housing 60 includes a housing body 66, which accommodates the turbine wheel 91. An accommodation space 65, in which the turbine wheel 91 is accommodated, is defined inside the housing body 66. The accommodation space 65 is connected to a scroll passage 61, which draws exhaust gas from the outside of the turbine housing 60 to the accommodation space 65. The scroll passage 61 is connected to the accommodation space 65 while extending spirally in the circumferential direction of the rotation axis 91a of the turbine wheel 91 on the outer side in the radial direction of the accommodation space 65.

The accommodation space 65 is connected to a connection passage 62, which discharges exhaust gas from the accommodation space 65. The connection passage 62 has a substantially circular cross section in a cross-sectional view orthogonal to the extending direction. The connection passage 62 includes an inlet portion 62a located on the upstream side and an outlet portion 62c located on the downstream side. In the connection passage 62, the inner diameter of the inlet portion 62a and the inner diameter of the outlet portion 62c are substantially the same.

A merging passage 63 that discharges exhaust gas to the outside of the turbine housing 60 is connected to the outlet portion 62c of the connection passage 62. The merging passage 63 includes a valve accommodating portion 63a located on the upstream side and an outlet portion 63c located on the downstream side. The outlet portion 63c of the merging passage 53 has a substantially circular cross section in a cross-sectional view orthogonal to the extending direction. The inner diameter of the outlet portion 63c of the merging passage 63 is substantially constant from the upstream end to the downstream end of the outlet portion 63c.

The housing body 66 of the turbine housing 60 has the bypass passage 64, which branches off the scroll passage 61. The bypass passage 64 bypasses the accommodation space 65 and is connected to the valve accommodating portion 63a in the merging passage 63. The bypass passage 64 extends linearly as a whole so as to connect the upstream portion of the scroll passage 61 and the valve accommodating portion 63a in the merging passage 63. The bypass passage 64 has a substantially circular cross section in a cross-sectional view orthogonal to the extending direction. The bypass passage 64 has an outlet portion 64c, which is a section including the downstream end. The inner diameter of the outlet portion 64c is smaller than the inner diameter of the outlet portion 62c of the connection passage 62.

As shown in FIG. 2, an upstream flange 67 extends from the outer surface of the housing body 66. The upstream flange 67 is located outside the upstream end of the scroll passage 61. The upstream flange 67 connects the upstream end of the scroll passage 61 to the section of the exhaust passage 13 that is on the upstream side of the turbine housing 60.

A downstream flange 68 extends from the outer surface of the housing body 66. The downstream flange 68 is located radially outside the outlet portion 63c of the merging passage 63. The downstream flange 68 connects the outlet portion 63c of the merging passage 63 to the section of the exhaust passage 13 on the downstream side of the turbine housing 60. The catalyst 21, which is arranged inside the exhaust passage 13, is located on the downstream side of the turbine housing 60. A region extended from the outlet portion 64c of the bypass passage 64 along the central axis of the outlet portion 64c is defined as an imaginary extension region 64e. The central portion of the catalyst 21 is positioned in the imaginary extension region 64e.

As shown in FIG. 2, the wastegate 80 has a substantially columnar pivot shaft 83. The pivot shaft 83 is located in the valve accommodating portion 63a of the turbine housing 60 and is arranged between the outlet portion 62c of the connection passage 62 and the outlet portion 64e of the bypass passage 64. A first end of the pivot shaft 83 (the end located on the back of the sheet of FIG. 2) is rotationally supported by the turbine housing 60. The first end of the pivot shaft 83 is connected to an actuator (not shown). As the actuator is driven, the pivot shaft 83 rotates clockwise or counterclockwise about the pivot axis 83a of the pivot shaft 83.

A first valve member 81 is fixed to a second end of the pivot shaft 83 (the end on the near side of the sheet of FIG. 2). The first valve member 81 closes the outlet portion 62c of the connection passage 62. The first valve member 81 is located on a first side (the clockwise side in FIG. 2) in the pivoting direction (the circumferential direction) of the pivot shaft 83. The first valve member 81 is provided with a substantially disk-shaped valve portion 81a. The outer diameter of the valve portion 81a is larger than the inner diameter of the outlet portion 62c of the connection passage 62. The valve portion 81a includes a protrusion 81b, which protrudes from the substantially central portion toward a second side (the counterclockwise side in FIG. 2) in the pivoting direction (the circumferential direction) in the pivot shaft 83.

A second valve member 82, which closes the outlet portion 64c of the bypass passage 64, is fixed to the protrusion 81b of the first valve member 81. The second valve member 82 is located on the second side (the counterclockwise side in FIG. 2) in the pivoting direction (the circumferential direction) of the pivot shaft 83 with respect to the first valve member 81. The second valve member 82 has a disk shape as a whole. The outer diameter of the second valve member 82 is larger than the inner diameter of the outlet portion 64c of the bypass passage 64. In the present embodiment, the second valve member 82 is fixed to the pivot shaft 83 via the first valve member 81. That is, the second valve member 82 is fixed to the pivot shaft 83 so as to be located separated from the first valve member 81 in the circumferential direction about the pivot axis 83a of the pivot shaft 83.

The valve portion 81a of the first valve member 81 has a first facing surface 81f, which faces the outlet portion 62c of the connection passage 62. The outlet portion 62c of the connection passage 62 has a first sealing surface 62*f*, which faces the first valve member 81. When the pivot shaft 83 pivots in one direction as shown in FIG. 2, the first facing surface 81*f* contacts the first sealing surface 62*f*. Accordingly, the first valve member 81 closes the outlet portion 62*c* of the connection passage 62. The second valve member 82 has a second facing surface 82*f*, which faces the outlet portion 64*c* of the bypass passage 64. The outlet portion 64*c* of the bypass passage 64 has a second sealing surface 64*f*, which faces the second valve member 82. When the pivot shaft 83 pivots in the other direction as shown in FIG. 3, the second facing surface 82*f* contacts the second sealing surface 64*f*. Accordingly, the second valve member 82 closes the outlet portion 64*c* of the bypass passage 64.

As shown in FIG. 2, the second sealing surface 64*f* of the bypass passage 64 is inclined with respect to a plane orthogonal to the central axis 64*d* of the outlet portion 64*c* of the bypass passage 64. Specifically, the second sealing surface 64*f* of the bypass passage 64 is inclined toward the side on which the outlet portion 62*c* of the connection passage 62 is located with respect co the plane orthogonal to the central axis 64*d* of the outlet portion 64*c*.

The central axis of the inlet portion 62*a* of the connection passage 62 is coaxial with the rotation axis 91*a* of the turbine wheel 91. The central axis 62*d* of the outlet portion 62*c* of the connection passage 62 is inclined with respect to the rotation axis 91*a* of the turbine wheel 91. The first sealing surface 62*f* of the outlet portion 62*c* of the connection passage 62 is oriented toward the side on which the outlet portion 64*c* of the bypass passage 64 is located. That is, the central axis 62*d* of the outlet portion 62*c* of the connection passage 62 is inclined with respect to the rotation axis 91*a* of the turbine wheel 91 toward the side on which the outlet portion 4*c* of the bypass passage 64 is located. In the present embodiment, the central axis 62*d* of the outlet portion 62*c* of the connection passage 62 is inclined by approximately 30 degrees with respect to the rotation axis 91*a* of the turbine wheel 91. The first sealing surface 62*f* of the outlet portion 62*c* of the connection passage 62 is substantially parallel to a plane orthogonal to the central axis 62*d* of the outlet portion 62*c* of the connection passage 62.

Figure 3:
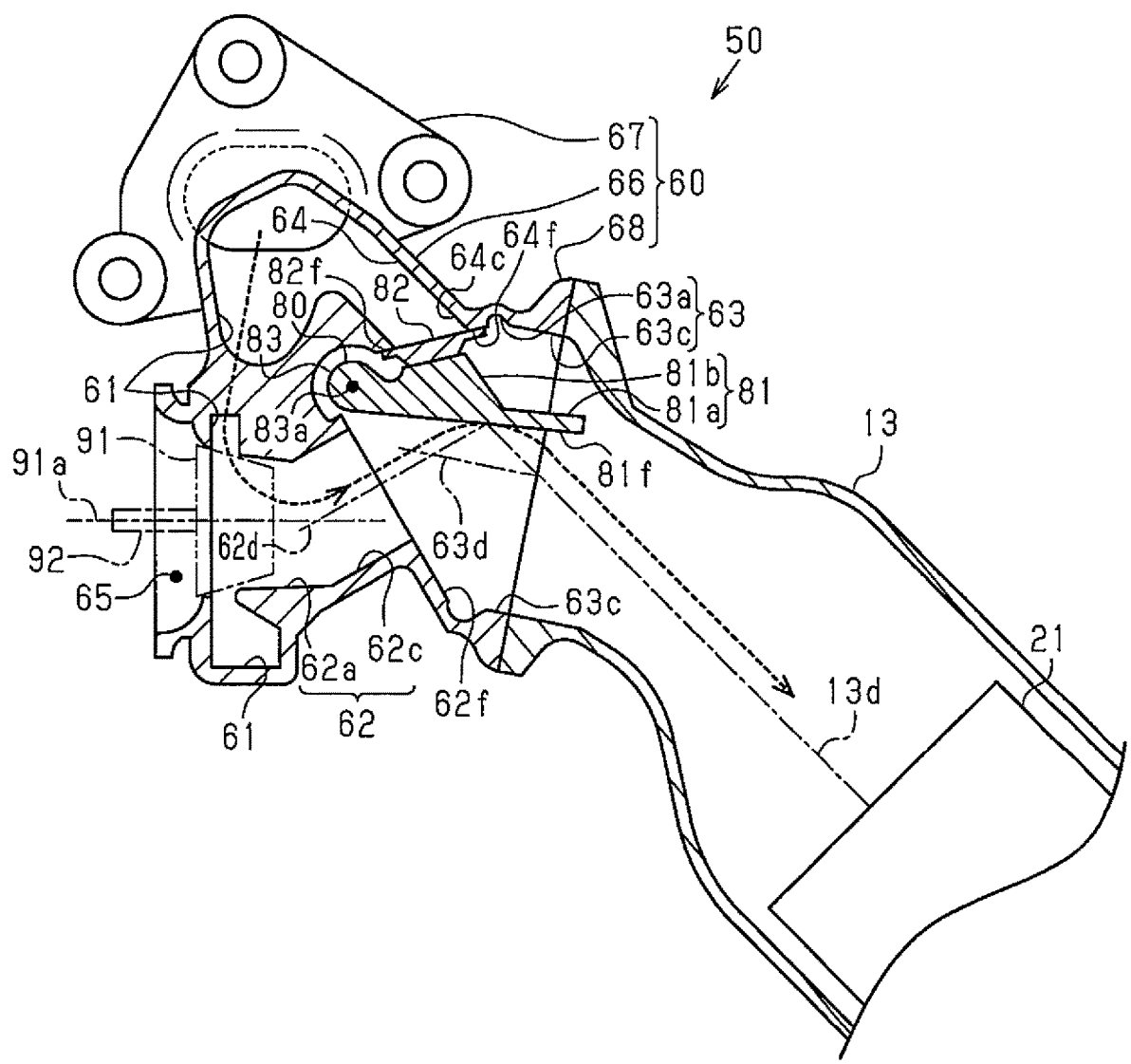
FIG. 3 is a cross-sectional view of the turbocharger of FIG. 2.

As shown in FIG. 3, the first facing surface 81*f* of the first valve member 81 is inclined with respect to the second facing surface 82*f* of the second valve member 82 to be separated away from the second facing surface 82*f* as the distance from the pivot axis 83*a* of the pivot shaft 83 increases. Specifically, the inclination angle of the first facing surface 81*f* with respect to the second facing surface 82*f* is determined such that, when the outlet portion 64*c* of the bypass passage 64 is closed by the second valve member 82, the first facing surface 81*f* is inclined with respect to the central axis 62*d* of the outlet portion 62*c* of the connection passage 62. Also, the first facing surface 81*f* faces the outlet portion 62*c* of the connection passage 62. In the present embodiment, the angle defined by the first facing surface 81*f* and the central axis 62*d* is approximately 35 degrees. Also, the inclination angle of the first facing surface 81*f* with respect to the second facing surface 82*f* is determined such that, when the outlet portion 64*c* of the bypass passage 64 is closed by the second valve member 82, the first facing surface 81*f* is located on the central axis 62*d* of the outlet portion 62*c* of the connection passage 62.

Further, the inclination angle of the first facing surface 81*f* with respect to the second facing surface 82*f* is determined such that, when the outlet portion 64*c* of the bypass passage 64 is closed by the second valve member 82, the first facing surface 81*f* is inclined with respect to the central axis 63*d* of the outlet portion 63*c* of the merging passage 63. Also, the first facing surface 81*f* faces the outlet portion 63*c* of the merging passage 63. Further, the inclination angle of the first facing surface 81*f* with respect to the second facing surface 82*f* is determined such that, when the outlet portion 64*c* of the bypass passage 64 is closed by the second valve member 82, the first facing surface 81*f* is inclined with respect to a central axis 13*d* of the section of the exhaust passage 13 on the downstream side of the turbine housing 60. Also, the inclination angle of the first facing surface 81*f* with respect to the second facing surface 82*f* is determined such that, when the outlet portion 64*c* of the bypass passage 64 is closed by the second valve member 82, the first facing surface 81*f* is located on the central axis 13*d* of the section of the exhaust passage 13 on the downstream side of the turbine housing 60. Further, the first facing surface 81*f* faces a section of the exhaust passage 13 that is on the downstream of the turbine housing 60. In the present embodiment, as inclination angles that satisfy these conditions, the angle defined by the first facing surface 81*f* and the central axis 63*d* is set to approximately 10 degrees and the angle defined by the first facing surface 81*f* and the central axis 13*d* is set to approximately 40 degrees.

As shown in FIG. 2, the inclination angle of the first facing surface 81*f* with respect to the second facing surface 82*f* and the distance in the circumferential direction of the pivot shaft 83 from the first facing surface 81*f* to the second facing surface 82*f* are determined such that, when the outlet portion 62*c* of the connection passage 62 is closed by the first valve member 81, the wastegate 80 is outside the imaginary extension region 64*e*. In the present embodiment, the inclination angle of the first facing surface 81*f* with respect to the second facing surface 82*f* and the distance in the circumferential direction of the pivot shaft 83 from the first facing surface 81*f* to the second facing surface 82*f* are determined by adjusting the protrusion length and protrusion direction of the protrusion 81*b* of the first valve member 81. Also, the inclination angle of the first facing surface 81*f* with respect to the second facing surface 82*f* is approximately 20 degrees.

Advantages of the present embodiment will be described together with its operation.

Figure 4:
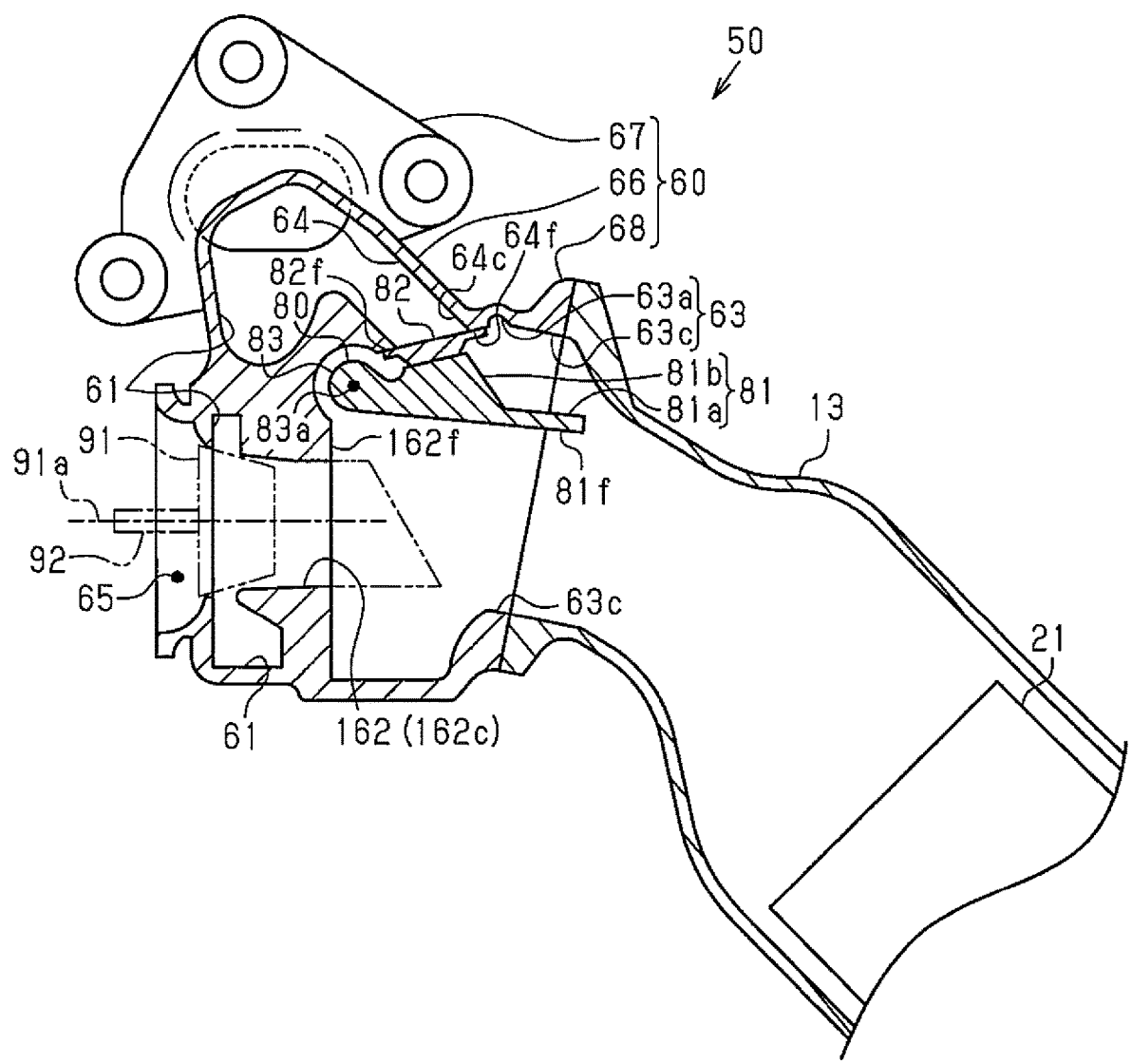
FIG. 4 is a cross-sectional view of a turbocharger of a comparison example.

(1) For example, in a comparative example shown in FIG. 4, the central axis of an outlet portion 162*c* of a connection passage 162 is coaxial with a rotation axis 91*a* of a turbine wheel 91. A first sealing surface 162*f* of the connection passage 162 is substantially parallel with a plane orthogonal to the central axis of the outlet portion 162*c* of the connection passage 162. In this case, the inclination angle between the first sealing surface 162*f* of the connection passage 162 and the second sealing surface 64*f* of the bypass passage 64 is approximately 100 degrees.

In contrast, in the present embodiment, the central axis 62*d* of the outlet portion 62*c* of the connection passage 62 is inclined with respect to the rotation axis 91*a* of the turbine wheel 91 toward the side on which the outlet portion 64*c* of the bypass passage 64 is located as shown in FIG. 2. Thus, the inclination angle between the first sealing surface 62*f* of the connection passage 62 and the second sealing surface 64*f* of the bypass passage 64 is smaller than that in the configuration of the comparative example described above. This reduces the pivoting range of the wastegate 80, which pivots between the first sealing surface 62*f* and the second sealing surface 64*f*. Such reduction in the pivoting range of the wastegate 80 allows, for example, the stroke of the actuator that drives the wastegate 80 to be reduced.

(2) It is new assumed that, in the configuration of the above comparative example, the first sealing surface 162f of the connection passage 162 is inclined with respect to a plane orthogonal to the central axis of the outlet portion 162c of the connection passage 162 so that the first sealing surface 162f is oriented toward the side on which the outlet portion 64c of the bypass passage 64 is located. In this case, the inclination angle between the first sealing surface 162f of the connection passage 162 and the second sealing surface 64f of the bypass passage 64 is small. However, in this case, since the first sealing surface 162f of the connection passage 162 is inclined as if cut obliquely, the opening area of the outlet portion 162c of the connection passage 162 is increased. Accordingly, the first valve member 81 of the wastegate 80 is enlarged in order to close the outlet portion 162c of the connection passage 162. In particular, the inner diameter of the outlet portion 162c of the connection passage 162 is larger than the inner diameter of the outlet portion 64c of the bypass passage 64. Therefore, the size of the first valve member 81, which is already larger than the second valve member 82, must be further increased. Such an increase in the size of the first valve member 81 of the wastegate 80 inevitably requires an actuator with a large driving force to pivot the wastegate 80. This can result in an increased size of the whole turbocharger 50.

In contrast, in the present embodiment, since the first sealing surface 62f of the connection passage 62 and the plane orthogonal to the central axis 62d of the outlet portion 62c of the connection passage 62 are substantially parallel as shown in FIG. 2, the opening area of the outlet portion 62c of the connection passage 62 is not excessively enlarged. This configuration prevents the first valve member 81, which closes the outlet portion 62c of the connection passage 62, from being enlarged, thereby preventing the wastegate 80 from being enlarged. In addition, if the wastegate 80 prevented from being enlarged, the driving force of the actuator that drives the wastegate 80 can be made relatively small. This prevents the actuator from being enlarged.

(2) In the present embodiment, when the outlet portion 64c of the bypass passage 64 is closed by the second valve member 82, the exhaust gas that has passed through the connection passage 62 flows toward the first valve member 81 as indicated by the arrows of broken lines in FIG. 3. The exhaust gas then applies to the wastegate 80 a force acting to close the outlet portion 64c of the bypass passage 64. Therefore, when the outlet portion 64c of the bypass passage 64 is closed, the closed state of the bypass passage 64 is further reliably maintained.

(4) It is now assumed that, when the outlet portion 64c of the bypass passage 64 is closed by the second valve member 82, the first facing surface 81f of the first valve member 81 is parallel to the central axis 62d of the outlet portion 62c of the connection passage 62. In this case, the exhaust gas flowing through the merging passage 63 flows to the downstream side while striking the inner surface of the merging passage 63. Therefore, a turbulent flow tends to occur inside the merging passage 63, which hampers a smooth flow of the exhaust gas.

In contrast, in the present embodiment, when the outlet portion 64c of the bypass passage 64 is closed by the second valve member 82, the first facing surface 81f of the first valve member 81 faces both the outlet portion 62c of the connection passage 62 and the outlet portion 63c of the merging passage 63 as shown in FIG. 3. The first facing surface 81f of the first valve member 81 is inclined with respect to both the central axis 62d of the outlet portion 62c of the connection passage 62 and the central axis 63d of the merging passage 63. Thus, when the outlet portion 64c of the bypass passage 64 is closed by the second valve member 82, the flow direction of the exhaust gas that has passed through the connection passage 62 is gradually changed by the first facing surface 81f of the first valve member 81, and the exhaust gas that has passed through the connection passage 62 is guided toward the outlet of the merging passage 63 as indicated by the arrows of broken lines in FIG. 3. This allows the exhaust gas that has passed through the connection passage 62 to flow smoothly in the merging passage 63. In particular, in the present embodiment, the first facing surface 81f of the first valve member 81 also faces the section of the exhaust passage 13 on the downstream side of the turbine housing 60. Also, the first facing surface 81f of the first valve member 81 is inclined with respect to the central axis 13d of the section of the exhaust passage 13 on the downstream side of the turbine housing 60. Therefore, the flow direction of the exhaust gas that has passed through the connection passage 62 is easily converted into the direction along the extending direction of the exhaust passage 13 by the first facing surface 81f of the first valve member 81, which contributes to smooth flow of the exhaust gas in the exhaust passage 13.

(5) In the present embodiment, when the outlet portion 62c of the connection passage 62 is closed by the first valve member 81 as shown in FIG. 2, the wastegate 80 is outside the imaginary extension region 64e. Thus, as indicated by the arrows of broken lines in FIG. 2, it is possible to prevent the wastegate 80 from blocking the exhaust gas that has passed through the bypass passage 64. As a result, the exhaust gas that has passed through the bypass passage 64 is easily and smoothly discharged from the inside of the turbine housing 60. Further, since the catalyst 21 in the exhaust passage 13 is located within the imaginary extension region 64e, the exhaust gas that has passed through the bypass passage 64 is easily guided toward the catalyst 21. For example, the catalyst 21 can be warmed up early by the exhaust gas that has passed through the bypass passage 64.

(6) In the present embodiment, the first facing surface 81f of the first valve member 81 is inclined with respect to the second facing surface 82f of the second valve member 82 to be separated away from the second facing surface 82f as the distance from the pivot axis 83a of the pivot shaft 83 increases. Therefore, as compared with a wastegate 80 in which the inclination angle between the first facing surface 81f of the first valve member 81 and the second facing surface 82f of the second valve member 82 is zero, the pivoting range of the wastegate 80, which pivots between the first sealing surface 62f and the second sealing surface 64f, is reduced.

The above-described embodiment may be modified as follows.

In the above-described embodiment, when the outlet portion 64c of the bypass passage 64 is closed by the second valve member 82, the first facing surface 81f of the first valve member 81 does not necessarily need to be located on the central axis 62d of the outlet portion 62c of the connection passage 62. For example, when a region obtained by extending the outlet portion 62c of the connection passage 62 along the central axis 62d of the outlet portion 62c of the connection passage 62 is defined as an imaginary region, the first facing surface 81f of the first valve member 81 may be located in the imaginary region. Even in this case, when the outlet portion 64c of the bypass passage 64 is closed by the second valve member 82, the exhaust gas that has passed through the connection passage 62 applies to the wastegate 80 a force acting to close the outlet portion 64c of the bypass passage 64.

Also, for example, if the force of the wastegate 80 chat closes the outlet portion 64c of the bypass passage 64 is sufficiently great when the outlet portion 64c of the bypass passage 64 is closed by the second valve member 82, the first facing surface 81f of the first valve member 81 does not necessarily need to be located in the imaginary region.

In the above-described embodiment, when the outlet portion 64c of the bypass passage 64 is closed by the second valve member 82, the first facing surface 81f of the first valve member 81 does not necessarily need to be located on the central axis 13d of the section of the exhaust passage 13 on the downstream side of the turbine housing 60. For example, it is only required that the first facing surface 81f of the first valve member 81 face both the outlet portion 62c of the connection passage 62 and the section of the exhaust passage 13 on the downstream side of the turbine housing 60. Also, it is only required that the first facing surface 81f of the first valve member 81 be inclined with respect to both the central axis 62d of the outlet portion 62c of the connection passage 62 and the central axis 13d of the section of the exhaust passage 13 on the downstream side of the turbine housing 60. Accordingly, the first facing surface 81f of the first valve member 81 guides the exhaust gas that has passed through the connection passage 62 from the merging passage 63 to the section of the exhaust passage 13 on the downstream side of the turbine housing 60.

Further, in a case in which the first facing surface 81f of the first valve member 81 is inclined with respect to both the central axis 62d of the outlet portion 62c of the connection passage 62 and the central axis 13a of the section of the exhaust passage 13 on the downstream side of the turbine housing 60, the first facing surface 81f does not necessarily need to be inclined with respect to the central axis 63d of the merging passage 63. Even if the first facing surface 81f of the first valve member 81 is not inclined with respect to the central axis 63d of the merging passage 63 in this manner, the exhaust gas that has passed through the connection passage 62 is easily guided from the merging passage 63 to the section of the exhaust passage 13 on the downstream side of the turbine housing 60 by the first facing surface 81f of the first valve member 81.

The inclination angle of the first facing surface 81f with respect to the second facing surface 82f may be changed as needed. For example, it is only required that, when the outlet portion 64c of the bypass passage 64 is closed by the second valve member 82, the first facing surface 81f face both the outlet portion 62c of the connection passage 62 and the outlet portion 63c in the merging passage 63. Then, if the first facing surface 81f is inclined with respect to both the central axis 62d of the outlet portion 62c of the connection passage 62 and the central axis 63d of the merging passage 63, the inclination angle of the first facing surface 81f with respect to the second facing surface 82f may be changed. In addition, the inclination angle of the first facing surface 81f with respect to the second facing surface 82f may be zero. Alternatively, the first facing surface 81f of the first valve member 81 may be inclined with respect to the second facing surface 82f so as to approach the second facing surface 82f of the second valve member 82 as the distance from the pivot axis 83a of the pivot shaft 83 increases.

In the above-described embodiment, the inclination angle of the first facing surface 81f with respect to the second facing surface 82f and the distance in the circumferential direction of the pivot shaft 83 from the first facing surface 81f to the second facing surface 82f are determined by adjusting the protrusion length and protrusion direction of the protrusion 81b of the first valve member 81. However, the configuration is not limited to this. For example, the inclination angle of the first facing surface 81f with respect to the second facing surface 82f and the distance in the circumferential direction of the pivot shaft 83 from the first facing surface 81f to the second facing surface 82f may be determined by the shape of the valve portion 81a of the first valve member 81 or the shape of the second valve member 82.

In the above-described embodiment, when the outlet portion 64c of the bypass passage 64 is closed by the second valve member 82, the first facing surface 81f of the first valve member 81 does not necessarily need to be inclined with respect to the central axis 62d of the outlet portion 62c of the connection passage 62 or the central axis 63d of the merging passage 63. For example, if the exhaust gas that has passed through the connection passage 62 can be guided to the outlet of the merging passage 63 by changing the shape of the merging passage, the first facing surface 81f of the first valve member 81 does not necessarily need to be inclined with respect to the central axis 62d of the outlet portion 62c of the connection passage 62 or the central axis 63d of the merging passage 63. In this case, the first facing surface 81f of the first valve member 81 does not necessarily need to face the outlet portion 62c of the connection passage 62 or the outlet portion 63c of the merging passage 63.

In the above-described embodiment, when the outlet portion 64c of the bypass passage 64 is closed by the second valve member 82, the first facing surface 81f of the first valve member 81 does not necessarily need to be inclined with respect to the central axis 13d of the section of the exhaust passage 13 on the downstream side of the turbine housing 60. For example, if the exhaust gas is allowed to flow smoothly by changing the shape of the merging passage 63 or the shape of the exhaust passage 13, the angular relationship between the first facing surface 81f of the first valve member 81 and the central axis 13d may be determined arbitrarily. In this case, the first facing surface 81f of the first valve member 81 does not necessarily need to face the section of the exhaust passage 13 on the downstream side of the turbine housing 60.

In the above-described embodiment, the wastegate 80 may be located within the imaginary extension region 64e when the outlet portion 62c of the connection passage 62 is closed by the first valve member 81. For example, part of the wastegate 80 may be located within the imaginary extension region 64e if the influence on the flow of the exhaust gas that has passed through the bypass passage 64 is small and the flow of the exhaust gas is not blocked.

In the above-described embodiment, the catalyst 21 in the exhaust passage 13 does not necessarily need to be located within the imaginary extension region 64e. For example, the shape of the exhaust passage 13 allows the exhaust gas that has passed through the bypass passage 64 to be easily guided to the catalyst 21 when the outlet portion 62c of the connection passage 62 is closed by the first valve member 81, the catalyst 21 in the exhaust passage 13 does not necessarily need to be located within the imaginary extension region 64e.

In the above-described embodiment, the first sealing surface 62f of the connection passage 62 may be inclined with respect to the plane orthogonal to the central axis 62d of the outlet portion 62c of the connection passage 62. For example, if the first sealing surface 62f of the connection passage 62 is inclined with respect to the plane orthogonal to the central axis 62d of the outlet portion 62c toward the side on which the outlet portion 64c of the bypass passage 64 is located, the inclination angle between the first sealing surface 62f of the connection passage 62 and the second sealing surface 64f of the bypass passage 64 can be further reduced. This allows for a further reduction in the pivoting range of the wastegate 80, which pivots between the first sealing surface 62f and the second sealing surface 64f.

The shape of the connection passage 62 in the above-described embodiment may be changed as needed. For example, both the central axis of the inlet portion 62a of the connection passage 62 and the central axis 62d of the outlet portion 62c of the connection passage 62 may be inclined with respect to the rotation axis 91a of the turbine wheel 91. Further, the connection passage 62 may be curved in an arcuate shape. Even in this case, it is only required that the central axis 62d of the outlet portion 62c of the connection passage 62 be inclined with respect to the rotation axis 91a of the turbine wheel 91 toward the side on which the outlet portion 64c of the bypass passage 64 is located.

The shape of the bypass passage 64 in the above-described embodiment may be changed as needed. In the above-described embodiment, the bypass passage 64 is connected to the scroll passage 61. However, the bypass passage 64 may be separated from the scroll passage 61 and be directly connected to the section of the exhaust passage 13 on the upstream side of the turbine housing 60. That is, the bypass passage 64 only needs to be connected to a section in an exhaust flow passage that is located on the upstream side of the accommodation space 65 and extend to bypass the accommodation space 65.

The invention claimed is:

1. A turbocharger comprising:
   a turbine housing, which accommodates a turbine wheel; and
   a wastegate, which is rotationally supported by turbine housing, wherein
   the turbine housing includes
      an accommodation space, in which the turbine wheel is accommodated,
      a scroll passage, which is connected to the accommodation space and is configured to draw exhaust gas from outside of the turbine housing to the accommodation space,
      a connection passage, which is connected to the accommodation space and is configured to discharge exhaust gas from the accommodation space,
      a merging passage, which is connected to the connection passage and is configured to discharge exhaust gas to the outside of the turbine housing, and
      a bypass passage, which bypasses the accommodation space and is connected to the merging passage,
   the connection passage has an outlet portion that is connected to the merging passage,
   the bypass passage has an outlet portion that is connected to the merging passage,
   the wastegate includes
      a pivot shaft, which is pivotally supported by the turbine housing,
      a first valve member, which is fixed to the pivot shaft and is configured to close the outlet portion of the connection passage, and
      a second valve member, which is fixed to the pivot shaft to be separated from the first valve member in a circumferential direction about a pivot axis of the pivot shaft, the second valve member being configured to close the outlet portion of the bypass passage, and
   a central axis of the outlet portion of the connection passage is inclined with respect to a rotation axis of the turbine wheel toward a side on which the outlet portion of the bypass passage is located.

2. The turbocharger according to claim 1, wherein, when the outlet portion of the bypass passage is closed by the second valve member, the first valve member is located on the central axis of the outlet portion of the connection passage.

3. The turbocharger according to claim 2, wherein
   the first valve member has a first facing surface, which faces the outlet portion of the connection passage when the outlet portion of the connection passage is closed by the first valve member,
   the second valve member has a second facing surface, which faces the outlet portion of the bypass passage when the outlet portion of e bypass passage is closed by the second valve member,
   the first facing surface is inclined with respect to the second facing surface to be separated away from the second facing surface as a distance from the pivot axis of the pivot shaft increases,
   the merging passage has an outlet portion, which discharges exhaust gas to the outside of the turbine housing, and
   an inclination angle of the first facing surface with respect to the second facing surface is set such that, when the outlet portion of the bypass passage is closed by the second valve member, in a cross-sectional view orthogonal to the pivot axis of the pivot shaft, the first facing surface faces both of the outlet portion of the connection passage and the outlet portion of the merging passage and is inclined with respect to both of the central axis of the outlet portion of the connection passage and the central axis of the outlet portion of the merging passage.

4. The turbocharger according to claim 2, wherein
   a region extended from the outlet portion of the bypass passage along the central axis of the outlet portion of the bypass passage is as an imaginary extension region, and
   the wastegate is outside the imaginary extension region when the outlet portion of the connection passage is closed by the first valve member.

5. The turbocharger according to claim 1, wherein
   the outlet portion of the connection passage has a sealing surface, which faces the first valve member, and
   the sealing surface is substantially parallel with a plane orthogonal to the central axis of the outlet portion of the connection passage.

* * * * *